(12) United States Patent
Wang

(10) Patent No.: US 9,683,716 B2
(45) Date of Patent: Jun. 20, 2017

(54) LENS HAVING DENSELY-DISTRIBUTED CONVEX FACETS ON ITS ENTRANCE AND EXIT SURFACES

(71) Applicant: Aurora Limited, St Albans (GB)

(72) Inventor: Ju Tang Wang, Xixiang (CN)

(73) Assignee: AURORA LIMITED, St Albans (GB)

( * ) Notice: Subject to any disclaimer, the term of this patent is extended or adjusted under 35 U.S.C. 154(b) by 93 days.

(21) Appl. No.: 14/759,965

(22) PCT Filed: Mar. 6, 2013

(86) PCT No.: PCT/GB2013/050541
§ 371 (c)(1),
(2) Date: Jul. 9, 2015

(87) PCT Pub. No.: WO2014/108662
PCT Pub. Date: Jul. 17, 2014

(65) Prior Publication Data
US 2015/0354780 A1    Dec. 10, 2015

(30) Foreign Application Priority Data

Jan. 10, 2013 (CN) ..................... 2013 2 0018512 U

(51) Int. Cl.
*F21V 5/00*     (2015.01)
*F21V 5/04*     (2006.01)
(Continued)

(52) U.S. Cl.
CPC ................ *F21V 5/045* (2013.01); *F21K 9/23* (2016.08); *F21K 9/238* (2016.08); *F21K 9/60* (2016.08); *F21S 8/02* (2013.01); *F21V 5/007* (2013.01); *F21V 5/04* (2013.01); *F21V 7/00* (2013.01); *F21V 7/0091* (2013.01); *F21V 17/10* (2013.01); *F21V 23/001* (2013.01); *F21V 23/005* (2013.01); *F21V 23/006* (2013.01); *F21V 29/70* (2015.01); *G02B 3/08* (2013.01); *G02B 19/0028* (2013.01); *G02B 19/0061* (2013.01); *F21K 9/00* (2013.01); *F21K 9/69* (2016.08);
(Continued)

(58) Field of Classification Search
CPC ...... F21K 9/00; F21K 9/23; F21K 9/60; F21S 8/02; F21V 29/20; F21V 29/70; F21V 5/007; F21V 5/04; F21V 5/045; F21V 7/00; G02B 3/08; G02B 6/0016; G02B 6/0068; F21Y 2115/10
See application file for complete search history.

(56) References Cited

U.S. PATENT DOCUMENTS 7,938,559 B2 *   5/2011   Angelini ................... F21V 5/04
                                                                      362/241
8,777,449 B2 *   7/2014   Van De Ven ............. F21S 8/02
                                                                   362/249.02

(Continued)

*Primary Examiner* — Peggy Neils

(57) ABSTRACT

LED-integrated lens comprising a light-entering section (1) in the shape of a hole, a light-emitting section (2) in the shape of a cup, incorporating an optical lens (3) positioned between said light-entering and light-emitting sections (1, 2) wherein the external surfaces of the light-entering (1) and of the light-emitting (2) sections include portions having densely-distributed convex facets. This lens enhances light utilization efficiency, avoids creating spots with color aberration hence greatly improves color rendering.

20 Claims, 4 Drawing Sheets

(51) Int. Cl.
*F21V 29/70* (2015.01)
*F21V 23/00* (2015.01)
*G02B 3/08* (2006.01)
*G02B 19/00* (2006.01)
*F21S 8/02* (2006.01)
*F21V 7/00* (2006.01)
*F21V 17/10* (2006.01)
*F21K 9/23* (2016.01)
*F21K 9/60* (2016.01)
*F21K 9/238* (2016.01)
*F21K 9/00* (2016.01)
*F21V 29/00* (2015.01)
*F21V 7/04* (2006.01)
*F21V 29/89* (2015.01)
*F21Y 101/00* (2016.01)
*F21Y 115/10* (2016.01)
*F21K 9/69* (2016.01)

(52) U.S. Cl.
CPC ............... *F21V 7/048* (2013.01); *F21V 29/20* (2013.01); *F21V 29/89* (2015.01); *F21Y 2101/00* (2013.01); *F21Y 2115/10* (2016.08)

(56) References Cited

U.S. PATENT DOCUMENTS

| | | | |
|---|---|---|---|
| 8,801,233 B2* | 8/2014 | Lu | F21V 5/002 362/249.02 |
| 8,864,344 B2* | 10/2014 | Jiang | F21V 5/04 362/309 |
| 9,347,642 B2* | 5/2016 | Catalano | F21V 5/04 |
| 9,360,185 B2* | 6/2016 | Demuynck | F21V 13/04 |
| 2009/0273945 A1* | 11/2009 | Lowry | G02B 6/0006 362/555 |
| 2011/0109217 A1* | 5/2011 | Kang | F21V 29/004 313/46 |
| 2013/0128578 A1* | 5/2013 | Yu | F21S 8/04 362/244 |

* cited by examiner

LENS HAVING DENSELY-DISTRIBUTED CONVEX FACETS ON ITS ENTRANCE AND EXIT SURFACES

FIELD OF THE INVENTION

The present invention relates to a new type of lens, in particular, but not exclusively, for use with an LED luminaire having an LED integrated light source.

BACKGROUND TO THE INVENTION

An LED integrated light source lens contributes to boosting the surface luminous efficiency of an LED integrated light source. An LED integrated light source lens of the known kind, comprising a light entering section in the shape of hole and of a light emitting section in the shape of a cup, has smooth surfaces on both the light entering and emitting sections. This has as a disadvantage that light utilisation efficiency of the LED integrated light source is very poor. A further disadvantage is that this arrangement creates luminous spots with obvious colour aberration, that is the colour rendering index is adversely affected.

SUMMARY OF THE INVENTION

According to the present invention an LED integrated light source lens comprising a light entering section in the shape of a hole, a light emitting section in the shape of a cup, is disclosed incorporating an optical lens positioned between the light entering section and the light emitting section, wherein the external surfaces of the light entering and emitting sections include portions having densely distributed convex facets.

Preferably, the optical lens has a spotted surface on one side.

Preferably, the optical lens has a curved surface on the other side.

Preferably, the curved surface is convex.

Preferably, the hole is provided with a non-spherical surface at its base

This construction has a number of advantages. The densely distributed convex facets on the external surfaces of the light entering and emitting sections, cause the LED integrated light source to emit multi-point lights, which enhances light utilisation efficiency, creates no spot lights with colour aberration, this in turn greatly improves the colour rendering index. The side of the optical lens having a spotted surface, creates multi-point lights. The other side of the optical lens, having a curved surface, changes the light beam angle.

A further advantage is that such a lens is relatively squat allowing for the use of LED light sources together with such a lens in new applications.

According to a second aspect of the present invention a lens is provided with a plurality of light entering sections, each in the shape of a hole, a light emitting section associated with each of the light entering sections, the light emitting section being in the shape of a cup, is disclosed incorporating an optical lens positioned between each light entering section and the associated light emitting section, wherein the external surfaces of the associated light entering and emitting sections include portions having densely distributed convex facets.

According to a third aspect of the present invention, a downlight comprises a casing, a light source, a lens according to the first or second aspects of the present invention, a lens holder and a heat sink.

Preferably, the downlight further comprises a glass and retaining means for the glass.

Preferably, the light source comprises one or more LEDs mounted on a circuit board. Preferably, the circuit board may be formed of a ceramic material. Alternatively, the circuit board may be formed of aluminium and a brass or copper disc located between the circuit board and the heat sink.

BRIEF DESCRIPTION OF THE DRAWINGS

The invention will now be described, by way of example only, in relation to the attached Figures, in which.

DESCRIPTION OF PREFERRED EMBODIMENTS

Figure 1:
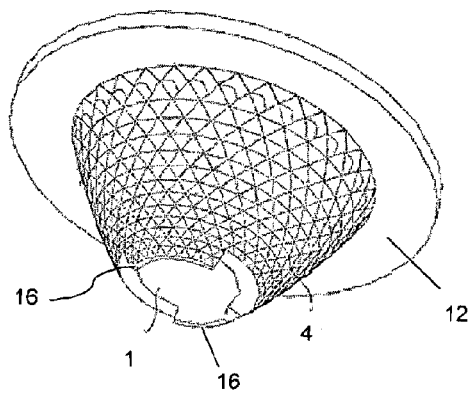
FIG. 1 shows a schematic perspective view of a first embodiment of a lens according to the present invention.
Figure 2:
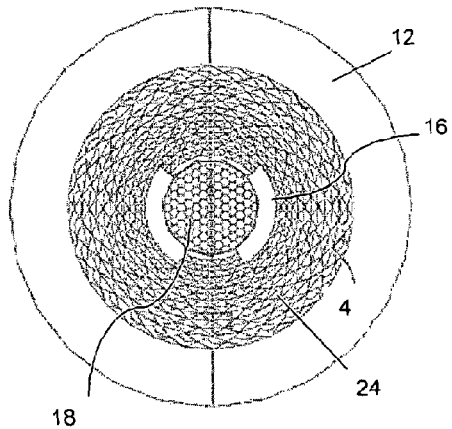
FIG. 2 shows a view from below of the lens of FIG. 1.
Figure 3:
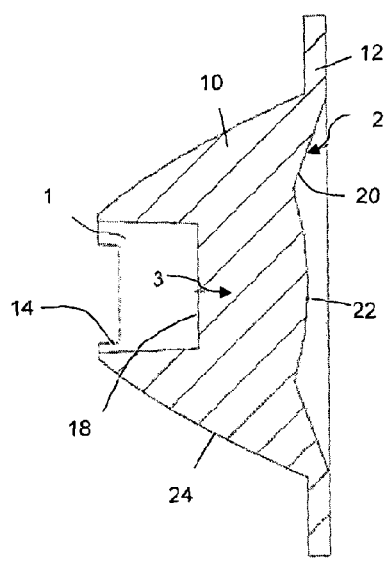
FIG. 3 shows a section along line A-A of FIG. 2.

Referring first to FIGS. 1 to 3, the lens can be seen to comprise a substantially solid body 10 having a generally conical or frusto-conical portion 4 provided with a flange 12 extending thereabout providing a circular periphery to the lens. The conical or frusto-conical portion 4 extends from the circular flange 12. The side of the flange 12 from which the conical or frusto-conical portion 4 extends will be referred to as the bottom or rear side and reference to an 'upper side', a 'front side', 'above' or 'below' should be interpreted accordingly.

The lens has a central vertical axis. The lens is formed from a transparent material. In the case of a transparent plastics material, the lens is preferably formed by injection moulding.

An upper portion of the conical or frusto-conical portion 4 is provided with a recess or hole provided therein. The hole is in the form of a blind recess. As may be seen form the figures the recess is hexagonal in section, though other sections may be used. The side or sides of the recess are aligned with the central vertical axis.

The tip of the conical or frusto-conical portion 4 is provided with two cut away portions 14 extending along a portion of a circumference of the conical or frusto-conical portion 4 to create two tabs 16 extending inbetween. From FIG. 2, it can be seen that the lens is symmetric about a central plane.

In use, an LED is located at the opening of the hole in the conical or frusto-conical portion 4, such that the hole forms a light entering section 1 of the lens. A base of the hole is provided with a refractive surface 18 for example a spotted surface. In this embodiment the refractive surface 18 is circular in shape. From FIG. 2 it can be seen that this has taken the form of a hexagonal pattern of convex facets formed on the surface of the base of the hole. In use, the refractive surface 18 creates multi-point light beams. Preferably, the refractive surface 18 is a non-spherical refractive surface. In this embodiment the refractive surface 18 is located on a generally level plane.

The external surface of the conical or frusto-conical portion 4 is provided with a network of densely distributed convex facets 24. In use, these facets 24 create multi-point light beams. The facets 24 of this embodiment can be seen to be generally triangular.

An external surface of the light entering section 1 can thus be seen to be provided with convex facets 24 on the conical or frusto-conical portion 4 and convex facets on the refractive surface 18.

The front of the lens is provided with a shaped recess. The shaped recess is in the shape of a cup, being generally concave, comprising an inclined surface 20 extending inwardly from the front face of the lens, the inclined surface 20 meeting a generally circular base 22 of the cup shape, the base 22 being convex in shape. The curved convex shape is used to change the light beam angle. The generally circular base 22 is provided with a network of refractive surfaces in the form of densely distributed convex facets. The inclined surface is preferably concave.

In use, the shaped recess forms a light emitting section 2 of the lens.

The portion of the lens between the hole and the shaped recess forms an optical body or lens 3 positioned therebetween.

It will be understood that the light entering section 1, the light emitting section 2 and the optical lens 3 are formed as a unitary or one piece body from the transparent material.

FIGS. 5 to 8 show a second embodiment of a lens in accordance with the present invention. It is noted that this embodiment (and those following) do not feature the cut out at the end of the conical or frusto-conical portion. Also, the hole or blind recess is circular in section.

This embodiment (and those following) is further distinguished by the pattern of the network of refractive surfaces.

Similar reference numerals are used to refer to similar aspects of the invention. Thus, a conical or frusto-conical portion of a lens is provided with a flange 112. A light entering section 101 includes an outer surface of the conical or frusto-conical portion provided with a network of refractive surfaces 124 and a non-spherical base surface 118 provided at rear surface of the lens. The network of refractive surfaces 124 generally diamond shaped. A generally concave light emitting section 102 comprises an inclined surface 120 extending inwardly from the front face of the lens, the inclined surface 120 meeting a generally circular base, the base being provided with a network of refractive surfaces 128. In this embodiment (and those following) the base is generally planer. An optic lens 103 is defined between the light entering section 101 and the light emitting section 102.

Figure 4:
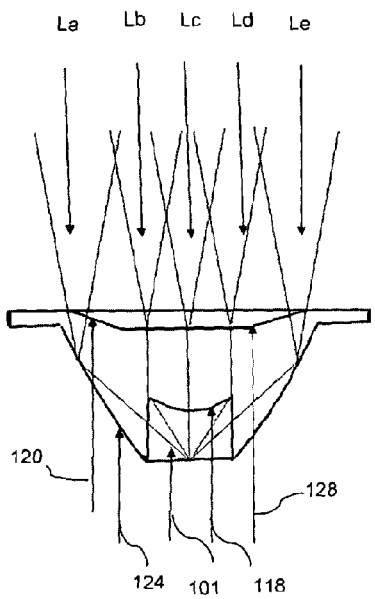
FIG. 4 shows a section similar to that of FIG. 3 showing schematically the flow of light through the lens.
Figure 5:
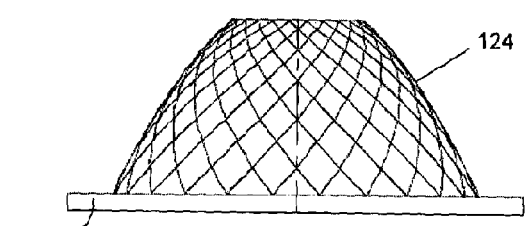
FIG. 5 shows a side view of a second embodiment of a lens according to the present invention.
Figure 6:
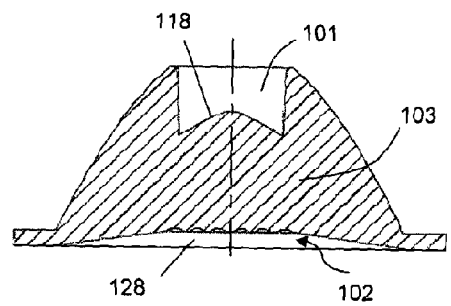
FIG. 6 shows a section along line A-A of FIG. 5.
Figure 7:
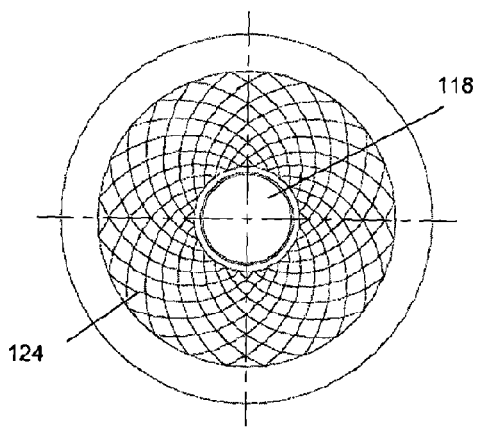
FIG. 7 shows a view from below of FIG. 5.
Figure 8:
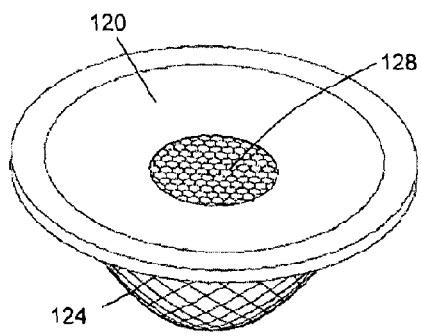
FIG. 8 shows a perspective view of the front of FIG. 5.

The functioning of the lens is now described with reference to FIG. 4. Light is emitted from a light source, such as an LED (not shown) and may adopt a number of paths. Light passing through the sides of the light entering section 101 will having passed through the lens encounter the network of convex facets 124. This causes the light at the surface to form multipoint full reflection lights directed back toward the light emitting surface section 102. The creation of multipoint full reflection lights decreases the glare index and increases the colour rendering index.

Light encountering the refractive surface 118 on the base of the hole is focussed on the network of refractive surfaces 128 on the light emitting section 102 of the lens. This improves light efficiency.

Light passing to the network of refractive surfaces 128 on the light emitting section 102 of the lens forms multi point refraction emitting light which decreases the glare index and increases the colour rendering index.

The inclined surface 120 surrounding the network of refractive surfaces on the light emitting section 102 of the lens facilitates the injection moulding process and improves product consistency.

Figure 9:
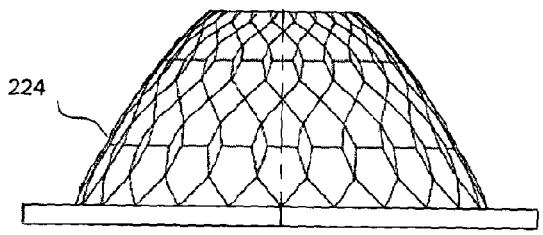
FIG. 9 shows a side view of a third embodiment of a lens according to the present invention.
Figure 10:
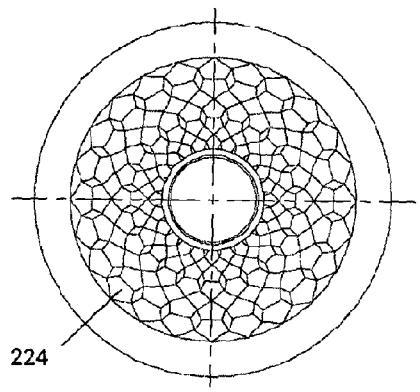
FIG. 10 shows a view from below of FIG. 9.

FIGS. 9 and 10 show a third embodiment of a lens in accordance with the present invention. The third embodiment is of similar section to the second embodiment and shows a further pattern of refractive surfaces 224, the facets comprising a mix of diamond shaped facets and pentagonal facets.

Figure 11:
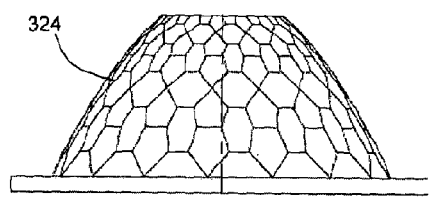
FIG. 11 shows a side view of a forth embodiment of a lens according to the present invention.
Figure 12:
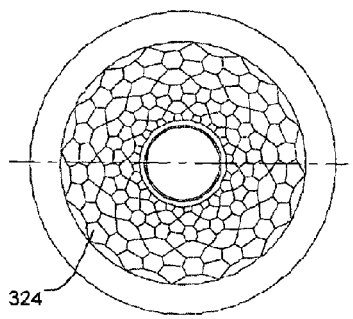
FIG. 12 shows a view from below of FIG. 11.

FIGS. 11 and 12 show a fourth embodiment of a lens in accordance with the present invention. The fourth embodiment is of similar section to the second embodiment and shows a further pattern of refractive surfaces 324, the facets comprising a mix of hexagonal facets and pentagonal facets.

Figure 13:
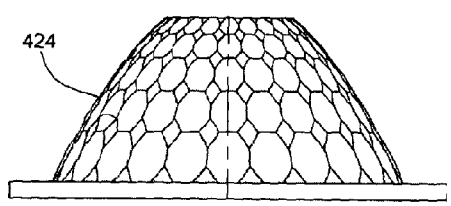
FIG. 13 shows a side view of a fifth embodiment of a lens according to the present invention.
Figure 14:
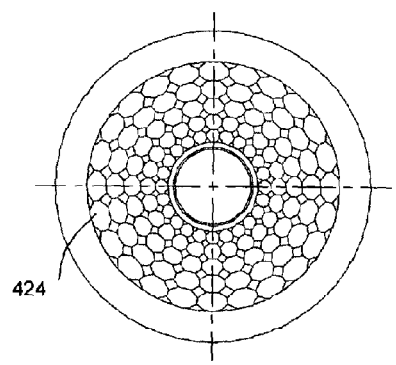
FIG. 14 shows a view from below of FIG. 13.

FIGS. 13 and 14 show a fifth embodiment of a lens in accordance with the present invention. The fifth embodiment is of similar section to the second embodiment and shows a further pattern of refractive surfaces 424, the facets comprising a mix of diamond shaped facets and octagonal facets.

Figure 15:
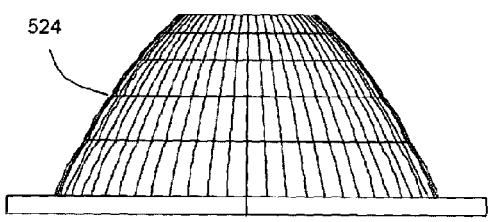
FIG. 15 shows a side view of a sixth embodiment of a lens according to the present invention.
Figure 16:
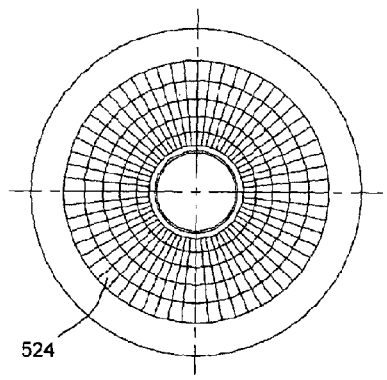
FIG. 16 shows a view from below of FIG. 15.

FIGS. 15 and 16 show a sixth embodiment of a lens in accordance with the present invention. The sixth embodiment is of similar section to the second embodiment and shows a further pattern of refractive surfaces 524, the facets comprising generally rectangular facets.

Figure 17:
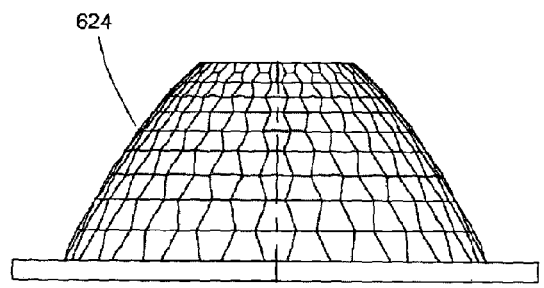
FIG. 17 shows a side view of a seventh embodiment of a lens according to the present invention.
Figure 18:
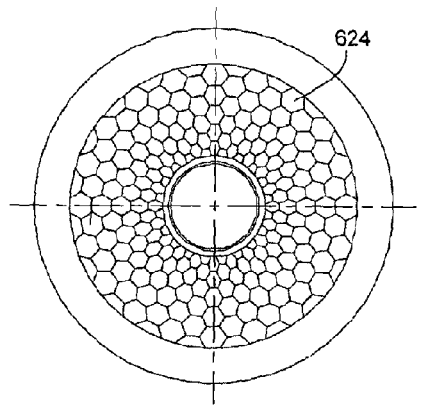
FIG. 18 shows a view from below of FIG. 17.

FIGS. 17 and 18 show an seventh embodiment of a lens in accordance with the present invention. The seventh embodiment is of similar section to the second embodiment and shows a further pattern of refractive surfaces 624, the facets comprising a patterning of polygonal facets.

In each of the embodiments the refractive surfaces comprise convex facets. In a further embodiment shown in use in FIG. 19, a lens is provided having a plurality of light entering sections, each having an associated light emitting section and an optical lens positioned between each light entering section and the associated light emitting section.

Figure 19:
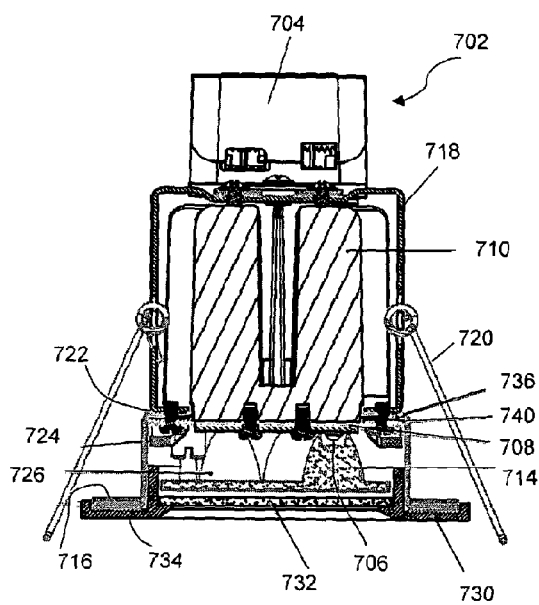
FIG. 19 is a sectional view of a first embodiment of a down light in accordance with a second aspect of the present invention.

Referring now to FIG. 19, there is shown a lighting unit is the form of a downlight unit 702 incorporating a terminal block, transformer unit or driver 704 provided on a mounting arm secured at one end to an upper end of the downlight unit 702.

The downlight unit comprises a light source 706 in the form of a plurality of LEDs mounted to a circuit board 708, for example an aluminium printed circuit board, the circuit board including control circuitry for the light source 706, a heat sink 710 connected to a cylindrical casing, the heat sink 710 being provided to a rear side of the circuit board 708 and a lens arrangement located at a front side of the circuit board 708.

A brass or copper disc 740 is provided between the circuit board 708 and the heat sink 710.

The term "cylindrical casing" means conforming approximately to the shape of a hollow cylinder. It will be understood that a misshapen cylinder will work equally well. Similarly, while the embodiments show a generally circular cylindrical tubular body other sections may be used with amendment to the sectional shape of other components.

The heat sink 710 is formed from any suitable material, preferably cast aluminium. The heat sink 710 comprises at a lower end an outer annular portion for location against an upper portion of the cylindrical casing. The annular portion surrounds an end face. In the illustrated embodiment the end face is proud of the annular portion.

The cylindrical casing comprises a mounting ring 714. The mounting ring 714 comprises a side wall having a lower peripheral annular flange extending outwardly from a bottom end of the side wall and an upper peripheral annular flange extending inwardly from an upper end of the side wall. The mounting ring 714 is formed from any suitable material, preferably steel.

The upper peripheral flange locates against the annular portion of the heat sink 710 and surrounds the end face of the heat sink.

A first ring or washer 716 of silicon is provided on the upper surface of the lower peripheral flange. In use, the ring or washer 716 butts up against a rim of an aperture into which the downlight is fitted.

A bracket 718 incorporating spring biased members or clips 720 is located about the heat sink 710. The spring biased members or clips 720 are adapted to secure the lighting unit in a recess in a known manner. It can be seen that the driver 704 is secured a central upper region of the bracket 718. The bracket 718 is secured to the upper peripheral flange of the mounting ring 714 in a suitable fashion, for example by screw fasteners 722.

The lens arrangement comprises a lens holder 724 and a lens 726 in accordance with the second aspect of the present invention. The lens holder 726 may be of any suitable material, for example a polycarbonate. The lens 724 may be of any suitable material, for example polymethylmethacrylate.

The lens 726 is retained in position relative to the light source 706 by the lens holder 724. The lens holder 724 comprises a ring or washer having a support structure for engaging and securing the lens 726 to the lens holder 724, as well as an inwardly directed finger or fingers. The lens 726 is provided with cooperating features to engaging the lens holder 724 and becoming secured to it. The lens holder 724 is secured at its periphery to the upper peripheral flange of the mounting ring 714 in a suitable fashion, for example by utilising the screw fasteners 722 securing the bracket 718 to the mounting ring 714.

A bezel 730 is fitted to an underside of the mounting ring 14. The bezel 730 may be of any suitable material, for example cast aluminium. The bezel 730 comprises an inner wall having an inwardly directed shoulder toward a lower end and a radially outwardly directed annular flange at the lower end. The inner wall extends within the side wall of the mounting ring 714. In use the inner wall of the bezel and the side wall of the mounting ring are provided with cooperating features, such as male and female parts of a bayonet fixing, to enable the bezel 730 to be secured to the mounting ring 714. In use the inner shoulder supports a glass 732 located in front of the lens 726. The glass 732 is of any suitable material to allow transmission of the light emitted from the lens 726.

Preferably a second ring or washer 734 of silicon extends between the radially outwardly directed annular flange of the bezel 30 and the first peripheral flange of the mounting ring 14.

The circuit board 708 is generally circular and provided with openings by which the circuit board may be located in position. In practice the brass or copper disc 740 is secured about its periphery to the mounting ring 714. The end face of the heat sink 10 is in thermal contact with a rear face of the brass or copper disc 740. The circuit board 708 is secured through the brass or copper disc 740 to the heat sink 710 by any suitable means such as fasteners.

A ring or washer 736 of a suitable fireproof material is preferably located between the edge of brass or copper disc 740 and the upper peripheral flange of the mounting ring 714.

Figure 20:
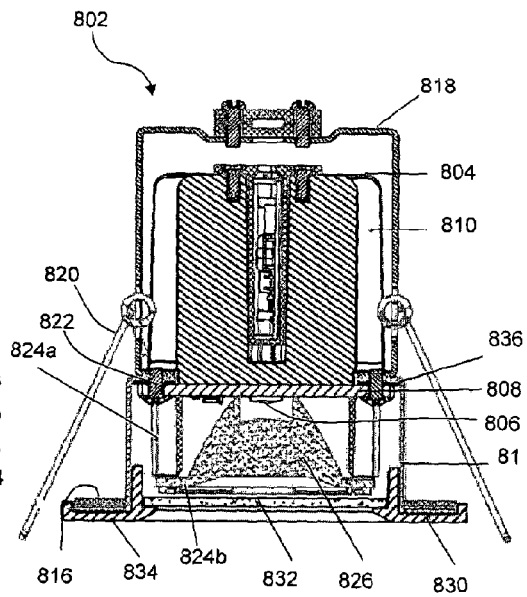
FIG. 20 is a sectional view of a second embodiment of a down light in accordance with a second aspect of the present invention.

A second embodiment of a downlight unit 802 in accordance with the present invention is shown in FIG. 20. Similar parts will be referred to by similar reference numerals. The downlight unit 802 comprises a light source 806 mounted to a circuit board 808, the circuit board including control circuitry for the light source 806, a heat sink 810 provided to a rear side of the circuit board 808 and a lens arrangement located at a front side of the circuit board. The mounting ring 814 is of like configuration to that of the previous embodiment.

A bracket 818 having depending legs and a central portion is provided in which spring biased members or clips 820 are mounted on each of the legs. Feet at the free ends of the legs are secured to the mounting ring 814.

A driver 804 is mounted within a driver box in turn located within a recess in the heat sink 810. The driver box is provided with flanges by which the driver box may be secured to an upper part of the heat sink 810 by any suitable means.

The heat sink 810 is mounted on the mounting ring 814 with a front face of the heat sink 810 being located within an upper annular flange of the mounting ring 814.

A first ring or washer 816 of silicon is provided on a lower peripheral flange of the mounting ring 814.

The circuit board 808 is secured to the mounting ring 814 by fasteners 822, such that the end face of the heat sink 810 is in thermal contact with a rear surface of the circuit board 808. The fasteners 822 also serve to secure a lens holder in position. The lens holder is used to locate a lens 826 in position.

In this embodiment, the lens holder comprises two parts. A first part 824a of the lens holder is secured in place to the upper peripheral flange of the mounting ring 814. A second part 824b of the lens holder retains a periphery of the lens 826 between itself and the first part 824a of the lens holder.

A glass 832 retained by a bezel 830, itself located within and by the mounting ring 814, is disposed in front of the lens 826 and lens holder. A second ring or washer 834 of silicon extends between the bezel 830 and the mounting ring 814. A ring or washer 836 of fireproof material is preferably located between the circuit board 808 and the mounting ring 824.

The invention claimed is:

1. An LED integrated light source lens comprising a light entering section in the shape of a blind recess, a light emitting section at a front face of the lens, an optical lens positioned between the light entering section and the light emitting section, the optical lens having a substantially solid generally conical or frustoconical body, the external surface of the conical or frustoconical body incorporating a network of densely distributed convex facets that cause the LED integrated light source lens to emit multi-point light beams, wherein the light emitting section comprises a generally cup-shaped recess comprising an inclined surface extending inwardly from the front face of the lens the inclined surface being concave, and the inclined surface meeting a base provided with a network of refractive surfaces.

2. The integrated light source lens according to claim 1, wherein the blind recess has a circular opening.

3. The LED integrated light source lens according to claim 1, comprising a plurality of light entering sections, each in the shape of a blind recess, a plurality of light emitting sections, and, incorporating an optical lens positioned between each light entering section and the associated light emitting section.

4. The integrated light source lens according to claim 3, wherein each blind recess is provided with a non-spherical surface at its base.

5. A downlight comprising a casing, an LED light source, an LED integrated light source lens according to claim 1, a lens holder and a heat sink.

6. The downlight according to claim 5, the downlight further comprising a glass and retaining means for the glass.

7. The downlight according to claim 5, wherein the light source comprises one or more LEDs mounted on a circuit board.

8. The downlight according to claim 7, wherein the circuit board is formed of a ceramic material.

9. The downlight according to claim 7, wherein the circuit board is formed of aluminium and a brass or copper disc is located between the circuit board and the heat sink.

10. The LED integrated light source lens according to claim 1, wherein the base of the light emitting section is generally circular.

11. The LED integrated light source lens according to claim 1, wherein the base of the light emitting section is convex in shape.

12. The LED integrated light source lens according to claim 1, wherein the network of refractive surfaces in the base of the light emitting section comprises densely distributed convex facets.

13. The LED integrated light source lens according to claim 1 wherein the blind recess is circular in section.

14. The LED integrated light source lens according to claim 1 wherein the blind recess is hexagonal in cross-section.

15. The LED integrated light source lens according to claim 1 wherein the base of the blind recess is provided with a refractive surface.

16. The LED integrated light source lens according to claim 15 wherein the refractive surface takes the form of a hexagonal pattern of convex facets formed on the surface of the base of the blind recess.

17. The LED integrated light source lens according to claim 15 wherein the refractive surface is a non-spherical refractive surface.

18. The LED integrated light source lens according to claim 15 wherein the refractive surface is located on a generally level plane.

19. The LED integrated light source lens according to claim 1 wherein the light entering section, the light emitting section, and the optical lens body are formed as a unitary or one piece body.

20. The LED integrated light source lens as in any of the preceding claims wherein the lens is formed from a transparent plastics material.

* * * * *